2,876,234

ORGANIC SILICON COMPOUNDS AND METHODS FOR MAKING THEM

Marvin J. Hurwitz, Elkins Park, and Peter L. de Benneville, Philadelphia, Pa., assignors to Rohm & Haas Company, Philadelphia, Pa., a corporation of Delaware No Drawing. Original application June 1, 1955, Serial No. 512,572. Divided and this application October 24, 1956, Serial No. 617,936

17 Claims. (Cl. 260—326.5)

This invention concerns the production of new organic silicon-containing compounds and novel methods of producing them. This application is a division of our co-pending application Serial No. 512,572, filed June 1, 1955.

In accordance with the present invention, the starting compounds for carrying out the reactions are aminosilanes which generally have the structure of Formula I:

I            $(R^0)_{4-x}Si(-NR'R'')_x$ where $R^0$ is a cyclohexyl group, an aryl group, especially phenyl, an alkenyl group, especially vinyl, allyl or cyclohexenyl, or an alkyl group having 1 to 18 carbon atoms, and especially an alkyl of 1 to 4 carbon atoms (groups $R^0$ may be the same or different when I contains a plurality thereof); R' and R'' together may be the morpholino residue $=(CH_2CH_2)_2O$, the piperidino residue $-(CH_2)_5-$, or the pyrrolidino residue $-(CH_2)_4-$, or separately; R' may be cyclohexyl, phenyl, aralkyl, especially benzyl, or an alkyl group having 1 to 18 carbon atoms; R'' may be hydrogen, cyclohexyl, aralkyl, especially benzyl, or an alkyl group having 1 to 18 carbon atoms, the total of carbon atoms in R' and R'' together being no greater than 18, with the proviso that when R' is an alkyl group containing a tertiary carbon atom attached to the nitrogen atom, then R'' must be H, and $x$ is an integer having a value of 1 to 4.

Throughout the specification and claims, the symbols above are used with the same meaning as defined above.

The compounds within the scope of Formula I are in many cases known and are generally liquids at normal temperatures. Generally the entire group can be made by reacting at low temperatures of 0° to 50° C., preferably 0° to 5° C., the corresponding mono-, di-, tri-, or tetra-chlorosilane or hydrocarbon-substituted chlorosilane with an appropriate amine of the formula NHR'R'' under anhydrous conditions, optionally in the presence of an inert organic solvent, such as benzene. Excess amine or additional tertiary amine, such as triethylamine, is provided to accept the hydrogen chloride liberated in the reaction and form the corresponding amine salt which may be removed by filtration. The filtrate is stripped of solvent, if any, and the product of Formula I is distilled.

According to the present invention, it has been found that compounds of Formula I react rapidly with amides and lactams containing reactive hydrogen. The reaction is apparently an equilibrium reaction involving the interchange of the amino group or groups —NR'R'' and the residue Z (representing all but the reactive hydrogen atom) of the reactive-hydrogen-containing amide or lactam according to the following equation illustrating the reaction between a monoaminosilane of Formula I with the mono-functional compound ZH containing the reactive hydrogen:

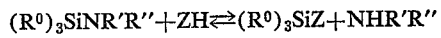

To shift the equilibrium to the right, it is merely necessary that the amine NHR'R'' be removed. This can be done simply by volatilization thereof provided the amine NHR'R'' corresponding to the group —NR'R'' in the silyl amine has a substantially lower boiling point than the compound ZH. The reaction may be performed either with or without an inert organic solvent, such as benzene, toluene, xylenes, solvent naphthas, but in any event anhydrous conditions should be maintained. The temperatures may range from 10° C. up to 180° C. or so, generally being effected at, or approximately at the boiling point of the amine to be liberated. One reactant may be added to the other gradually to facilitate proper control of the temperature, but this is not always necessary, depending on the particular reactants ZH and of Formulas I and I$a$.

Because of the simplicity of removing the displaced amine by volatilization, this process is highly advantageous for producing the new compounds described hereinafter. The advantage of the process of the present invention lies in the fact that by merely warming or heating the two reactants (ZH and a compound of Formula I), an amine is released and the condensation is effected. Since no acidic material, such as HCl, is released (as in the method described hereinafter using chlorosilanes or the like), there is no acid catalyzed degradation of the products, and there is no material present other than the condensation product (such as an amine hydrochloride where an amine is used as an HCl acceptor). The yields are higher in the new process than when chlorosilanes are used.

Generally the most useful starting compounds of Formula I are those in which the amino group or groups —NR'R'' correspond to the lower primary or secondary alkyl amines such as methylamine, dimethylamine, ethylamine, diethylamine, propylamine, dipropylamine, isopropylamine, or t-butylamine. These amines have boiling points of about 56° C. or below. However, when the reactive-hydrogen-containing compound ZH is one which requires a higher reaction temperature, the compounds of Formula I may contain groups —NR'R'' corresponding to amines NHR'R'' of higher boiling point provided it is substantially lower than the boiling point of the compound ZH. The higher boiling primary and secondary amines may be used, such as t-amylamine, hexylamine, cyclohexylamine, t-octylamine, decylamine, octadecylamine, morpholine, piperidine, pyrrolidine, aniline, and benzylamine.

By reacting the compounds of Formula I with amides or lactams, the new class of valuable organic silicon-containing compords of the present invention are readily obtained in good yields.

An important group of these new compounds are those which are obtained from amides and have the structure of Formula V following:

V         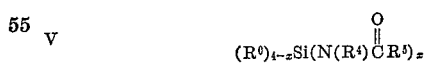

where $R^4$ is H, alkyl, or alkenyl, especially those having 1 to 18 carbon atoms, such as methyl, ethyl, butyl, hexyl, dodecenyl, octyl, octadecyl, etc., and $R^5$ is H, cyclohexyl, aryl, such as phenyl, alkenyl, or alkyl, especially these types of groups having from 1 to 18 carbon atoms, such as methyl, ethyl, isopropyl, butyl, hexyl, octyl, octadecyl, etc.

Examples of amides that may be reacted to form compounds of Formula V include formamide, N-methyl formamide, N-octadecyl formamide, acetamide, N-methyl acetamide, N-ethyl acetamide, N-dodecyl acetamide, propionamide, N-alkyl propionamides, e. g. N-methyl propionamide, butyramide and N-alkyl butyramides; lauramide, and N-alkyl lauramides; stearamide, and N-alkyl stearamides, such as N-methyl stearamide and N-ethyl stearamide, benzamide, N-substituted benzamides, e. g. N-methylbenzamide, methacrylamide, N-methylmethacrylamide, acrylamide, and N-ethylacrylamide.

Another group obtained from the lactams include compounds having the structure of Formula VI:

VI 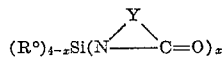

where Y is an alkylene group having 3 to 18 carbon atoms, with a chain of at least 3 but no more than 5 carbon atoms extending between the N atom and carbonyl group.

Examples of lactams that may be used include γ-butyrolactam, (2-pyrrolidone), delta-valerolactam, episilon-caprolactam, 3-methyl-2-pyrrolidone, trimethyl-2-pyrrolidone, and 5-methyl-2-pyrrolidone.

The amides and lactams of Formulas V and VI are generally (1) solids, some of which may be distilled, or (2) high-boiling liquids. Thus, when X is 1 in Formulas V and VI, the products are generally distillable solids or liquids. When $x$ is 2 to 4, the products are solids to all intents and purposes at room temperatures.

The silyamides or silyllactams of Formulas V and VI, when $R^0$ is methyl, frequently have physiological effects and act as hypnotics and anticonvulsants. They also serve as pesticides, and especially as insecticides and miticides. The compounds of Formulas V and VI may be applied to leather, fabrics of cotton, rayon, polyethylene terephthalate, nylon, zein, casein, or the like, or to non-fibrous sheets of cellophane or polyethylene terephthalate to modify the water-absorption, shrinkage, and dyeing properties of the leather, fabrics or non-fibrous sheets. Those derived from unsaturated compounds, such as acrylamide, methacrylamide, and the like are also polymerizable by simple addition in the presence of free radical initiators or catalysts, such as benzoyl peroxide, azoisobutyronitrile, azoisobutyramide, or the diesters of azoisobutyrate. Such addition polymerization produces fusible products which may be applied to leather, paper pulp, fabrics of the type named, or the non-fibrous films or sheets named above, and then converted to infusible condition by heating to 230° to 300° F. for several minutes to a half hour.

The new compounds may also be obtained by reacting a reactive hydrogen-containing amide or lactam with a chlorosilane of Formula Id:

Id $\qquad (R^0)_{4-x}SiCl_x$ where the symbols have the same definitions as before.

The reaction is effected in the presence of a tertiary amine, such as trimethylamine, triethylamine, pyridine or quinoline, as an acceptor for the hydrogen chloride developed by the reaction. The reaction may be effected at a temperature of about −20° C. to room temperature, preferably between −5° C. and +10° C. The reaction is preferably carried out in an anhydrous solvent, such as benzene, toluene or xylenes, or one of the tertiary amines above. The reaction is rapid and exothermic and, therefore, it is preferred to add one of the reactants or a solution of one of the reactants to the other reactant or to a solution thereof in one of the anhydrous solvents mentioned above at a rate that is sufficiently slow to enable proper control of the temperature by cooling means. Generally, the reaction is complete at the end of the addition of one reactant to the other. Sufficient tertiary amine should be added to take up all of the hydrogen chloride liberated and preferably an excess over this amount is used.

For reasons pointed out hereinabove, however, the use of an amino-silico-compound of Formula I as the starting material for making these new compounds is distinctly advantageous. In some cases, especially in the making of the new compounds from ureas, the compounds of Formula Id either do not react or they produce a complex mixture containing by-products which is of such a character that isolation of the desired product is practically impossible.

ILLUSTRATIVE PREPARATION OF COMPOUNDS OF FORMULA I

*Example A*

A solution is made of 365 parts of t-butylamine in 600 parts of benzene. There is added dropwise to this solution, at 0 to 5° C., a solution of 217 parts of trimethylchlorosilane in 600 parts of dry benzene. After addition is completed, the reaction mixture is filtered and the solid residue washed with dry benzene. The benzene solutions are distilled and the product, trimethyl-t-butylaminosilane, boiling at 118° to 119° C., $n_D^{25}$ 1.4060 is used in the subsequent reactions. It analyzes 9.7% nitrogen (9.6% theoretical).

In similar fashion, when dry diethylamine is substituted for the t-butylamine, there is obtained trimethyl-(diethylamino)silane in the fraction boiling in the range 125° to 127° C., $n_D^{25}$ 1.4105, and containing by analysis 9.7% N (theory 9.6%).

To a solution of 39 parts of benzylamine and 60 parts of triethylamine in 300 parts of benzene is added at 0° to 5° C. 40 parts of trimethylchlorosilane. Benzylaminotrimethylsilane, isolated as in the preceding examples in a fraction boiling at 95° to 96° C. at 15 mm. of mercury, $n_D^{25}$ 1.4918 (percent, N, 7.9 found, 7.8 calculated).

By similar methods, there are prepared 1,1,3,3-tetramethylbutylaminotrimethylsilane, obtained in a fraction having a boiling range of 190° to 195° C., and trimethylsilylaniline, in a fraction having a boiling range of 92° to 93° C. at 12 mm. of mercury.

The following examples are illustrative of the invention, parts given being by weight unless otherwise noted:

*Example 1*

To a stirred mixture of 5.9 parts of acetamide, 12.1 parts of triethylamine, and 88 parts of benzene is added dropwise a mixture of 29.5 parts of triphenylchlorosilane and 88 parts of benzene. The mixture is then refluxed for two hours and filtered while hot. Alternate partial stripping and filtration removes all the triethylamine hydrochloride to leave 15 parts (47% yield) of product, N-triphenylsilylacetamide, M. P. 159° to 163° C. *Analysis.*—Found: N, 4.2%; theory: N, 4.4%.

*Example 2*

(a) A mixture of 22 parts of t-butylaminotrimethylsilane and 14.5 parts of benzamide is heated until, at 120° C., 9 parts of t-butylamine is removed. The solid residue is distilled, the fraction boiling in the range 142° to 143° C./0.54 mm. Hg giving 22 parts (a 96% yield) of product, N-trimethylsilylbenzamide, M. P. 118° to 120° C. *Analysis.*—Found: C, 62.2%; H, 8.0%; N, 7.2%. Theory: C, 62.2%, H, 7.8%, N, 7.3%.

(b) When benzamide is reacted with trimethylchlorosilane in benzene and in the presence of triethylamine, by a procedure similar to that described in Example 1, there is obtained only a 52% yield of the same product as in part (a) hereof.

(c) The procedure of part (a) is repeated substituting 34.9 parts of stearamide for the benzamide. The product, N-trimethylsilylstearamide 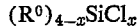 is a waxy solid which imparts water-repellency when applied to leather, such as shoes, textiles, paper, and so on.

*Example 3*

To a stirred mixture of 23.4 parts of N-methylacetamide, 70 parts of triethylamine and 196 parts of dry benzene, is added 35 parts of trimethylchlorosilane in 79 parts of dry benzene, at 0° to 5° C. The reaction mixture is then filtered and the filtrate is distilled to yield 35 parts (76% yield) of product, N-methyl-N-trimethylsilylacetamide, in the fraction having a boiling range of 48° to 49° C./11 mm. Hg, $n_D^{24}$ 1.4379. *Analysis.*— Found: C, 49.7%; H, 10.4%; N, 9.7%. Theory: C, 49.6%; H, 10.3%, N, 9.7%.

*Example 4*

(a) A mixture of 18 parts of formamide and 80 parts of dry benzene is distilled until 5 parts of the benzene is removed, the boiling point then being 80° C. The mixture is then cooled and 58 parts of t-butylaminotrimethylsilane is added. The reaction mixture is then heated under a Vigreux column and distilling head. A total of 63 parts of distillate is removed, boiling range 65° to 75° C., after which time the temperature of the distillate rises to 80° C.

An aliquot portion of the distillate is titrated with 0.1 N HCl giving a total amine value of 28.8 parts (theoretical t-butylamine: 29.2 parts). The residue is then distilled under vacuum to yield 40 parts of N-trimethylsilylformamide in the fraction boiling in the range 84° to 85° C./21 mm. Hg. *Analysis.*—Calculated: N, 12.1%. Found: 12.4%.

(b) A mixture of 19 parts of t-butylaminotrimethylsilane and 7 parts of acetamide is heated at 75° C. for 1½ hours during which 7 parts of t-butylamine is distilled. The residue is distilled to yield 15 parts (a 96% yield) of product, N-trimethylsilylacetamide, B. P. 185° to 186° C., M. P. 52° to 54° C. *Analysis.*—Found: C, 45.6%; H, 9.9%, N, 10.6%. Theory: C, 45.8%; H, 9.9%; N, 10.7%. It exhibits hypnotic and anticonvulsant properties.

*Example 5*

A solution is made of 284 parts of methacrylamide and 1010 parts of triethylamine in 3000 parts of dry benzene. This is cooled to 5° C., and a solution of 435 parts of trimethylchlorosilane in 750 parts of benzene is added gradually with stirring at such a rate as to approximately maintain this temperature. After addition is complete, the mixture is filtered and the benzene is removed by heating on a steam bath in vacuo. There results 480 parts of N-trimethylsilylmethacrylamide as a crude solid. This is further purified by heatnig to 70° C. at 0.8 mm. Hg. The solid then sublimes and is isolated on an approximately chilled surface. The sublimed solid melts at 65° to 68° C. When dissolved in toluene, this solid is polymerized by heating at 75° C. for 24 hours in the presence of about 1% azoisobutyronitrile catalyst. Films may be cast from this solution. The solution of the polymer may also be applied to leather, fabric, etc. with or without further heating to modify water-absorption and shrinkage properties thereof. A similarly useful product can be prepared using acrylamide instead of methacrylamide in equivalent amount.

*Example 6*

(a) In a flask there is placed 528 parts of dry benzene and 275 parts (3.75 moles) of dry n-butylamine. To this solution is added at 5° to 10° C. a solution of 80.8 parts (0.5 mole) of vinyltrichlorosilane in 132 parts of dry benzene over a period of 40 minutes. Some solid precipitates. The reaction mixture is heated at reflux (80° C.) for one hour and is then allowed to stand at room temperature for 65 hours. Then there is filtered off 147 parts of n-butylamine hydrochloride which corresponds to 89.6% of theory. The benzene filtrate when stripped to 300 cc. gives an additional 15.7 parts of n-butylamine hydrochloride (9.5% of theory). Distillation of the benzene filtrate yields 55.3 parts of a cloudy yellow oil, tri-(n-butylamino)vinylsilane, in the fraction boiling in the range 110° to 112° C./0.9 mm. Hg and having a neutral equivalent of 91.9 (theory=90.5).

(b) In a flask there is placed 27.6 parts (0.1 mole) of tri-n-butylaminovinylsilane and 17.7 parts (0.3 mole) of acetamide. The flask is attached to a still head. The reaction mixture is heated at 120° to 160° C. for two hours during which time 20.9 parts (theory=21.9) of n-butylamine is obtained. The reaction mixture solidifies upon cooling to room temperature. The solid is washed with ether to remove unreacted tri-n-butylaminovinylsilane. The product, triacetamido-vinylsilane, is a white ether-insoluble solid which partially melts on heating.

*Example 7*

To a stirred mixture of 34 parts of pyrrolidone, 48.5 parts of triethylamine and 66 parts of dry benzene is added a mixture of 43.5 parts of trimethylchlorosilane and 40 parts of benzene, at 0° to 2° C. The reaction mixture is then filtered and the filtrate is distilled to yield 56.5 parts (79.5% yield) of product, N-trimethylsilylpyrrolidone, in the fraction boiling in the range 77° to 81° C./6 mm. Hg. *Analysis.*—Found: C, 53.5%, H, 9.8%, N, 9.0%. Theory, C, 53.5%, H, 9.6%, N, 8.9%. It exhibits hypnotic and anticonvulsant properties.

At a concentration of 1 part in 800 parts of a high-boiling aromatic naphtha, the application of this product effects a 72% kill of red spider mites.

It is to be understood that changes and variations may be made without departing from the spirit and scope of the invention as defined in the appended claims.

We claim:

1. As a new composition of matter, a compound selected from the class having the Formulas V and VI following:

V 

VI 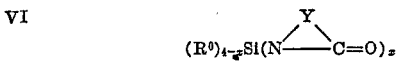

where $R^0$ is selected from the group consisting of cyclohexyl, cyclohexenyl, phenyl, alkenyl and alkyl groups having 1 to 18 carbon atoms; $R^4$ is selected from the group consisting of hydrogen and alkyl and alkenyl groups having 1 to 18 carbon atoms; $R^5$ is selected from the group consisting of hydrogen, cyclohexyl, phenyl, and alkenyl and alkyl groups having 1 to 18 carbon atoms; Y is an alkylene group having 3 to 18 carbon atoms, with a chain of at least 3 but no more than 5 carbon atoms extending between the N atom and carbonyl group, and $x$ is an integer having a value of 1 to 4.

2. As a new composition of matter, a compound having the formula

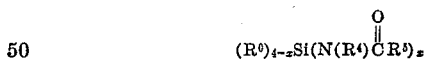

where $R^0$ is an alkyl group having 1 to 4 carbon atoms, $R^4$ is an alkyl group having 1 to 18 carbon atoms, $R^5$ is an alkyl group having 1 to 18 carbon atoms, and $x$ is an integer having a value of 1 to 4.

3. As a new composition of matter, a compound having the formula

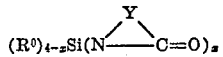

where $R^0$ is an alkyl group having 1 to 4 carbon atoms, Y is an alkylene group having 3 to 18 carbon atoms, with a chain of at least 3 but no more than 5 carbon atoms extending between the N atom and carbonyl group, and $x$ is an integer having a value of 1 to 4.

4. As a new composition of matter, a compound having the formula

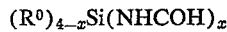

where $R^0$ is an alkyl group having 1 to 4 carbon atoms, and $x$ is an integer having a value of 1 to 4.

5. As a new composition of matter, a compound having the formula

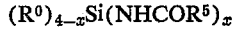

where $R^0$ is an alkyl group having 1 to 4 carbon atoms, $R^5$ is an alkyl group having 1 to 18 carbon atoms, and $x$ is an integer having a value of 1 to 4.

6. N-triphenylsilylacetamide.
7. N-trimethylsilylbenzamide.
8. N-methyl-N-trimethylsilylacetamide.
9. N-trimethylsilylformamide.
10. N-trimethylsilylacetamide.
11. N-trimethylsilylmethacrylamide.
12. Triacetamidovinylsilane.
13. N-trimethylsilylpyrrolidone.
14. The method for producing silicon-containing organic compounds which comprises reacting a silicon-containing compound having the formula $$(R^0)_{4-x}Si(-NR'R'')_x$$

where $R^0$ is selected from the group consisting of cyclohexyl, cyclohexenyl, phenyl, alkenyl, and alkyl groups having 1 to 18 carbon atoms; $x$ is an integer having a value of 1 to 4; $R'$, when not directly connected to $R''$, is selected from the group consisting of cyclohexyl, phenyl, benzyl, and alkyl groups having 1 to 18 carbon atoms; $R''$, when not directly connected to $R'$ is selected from the group consisting of hydrogen, cyclohexyl, benzyl, and alkyl groups having 1 to 18 carbon atoms, the total of carbon atoms in $R'$ and $R''$ together being no greater than 18, with the proviso that when $R'$ is an alkyl group containing a tertiary carbon atom attached to the nitrogen atom, $R''$ is H, and $R'$ and $R''$, when directly connected together, are selected from the group consisting of the morpholino residue $$=(CH_2CH_2)O$$

the piperidino residue $-(CH_2)_5-$, and the pyrrolidino residue $-(CH_2)_4-$, with a compound selected from the group consisting of amides and lactams containing a reactive hydrogen atom.

15. A method as defined in claim 14 in which the reaction is carried out at a temperature between 10° and about 180° C.

16. A method as defined in claim 14 in which the reaction is carried out in an inert organic solvent at a temperature between 10° and about 180° C.

17. A method as defined in claim 14 in which the reaction is carried out in an inert organic solvent at a temperature between 10° and about 180° C. while distilling off the amine $NHR'R''$ formed.

References Cited in the file of this patent
UNITED STATES PATENTS

| | | |
|---|---|---|
| 2,370,142 | Bruson | Feb. 27, 1945 |
| 2,432,438 | Ofner et al. | Dec. 9, 1947 |
| 2,555,354 | Lucas et al. | June 5, 1951 |
| 2,654,764 | Seemann et al. | Oct. 6, 1953 |

OTHER REFERENCES

Rochow et al.: J. Am. Chem. Soc., page 4852, vol. 76, 1954.

Larsson: Svensk Kem. Tid, vol. 61, 1949, pages 59–61.

Anderson: Jour. Am. Chem. Soc., vol. 73, pages 5802–5803, December 1951.